United States Patent
Hanson

Patent Number: 5,667,623
Date of Patent: Sep. 16, 1997

[54] METHOD AND APPARATUS FOR WRAPPING A JOINT OF PIPE WITH A WEB OF CONCRETE MATERIAL

[75] Inventor: George Hanson, Belle Chasse, La.

[73] Assignee: Bredero Price Company, Harvey, La.

[21] Appl. No.: 527,930

[22] Filed: Sep. 14, 1995

[51] Int. Cl.⁶ .................................................. B32B 35/00
[52] U.S. Cl. ......................... 156/367; 156/429; 156/431; 156/450; 156/458
[58] Field of Search ................................. 156/367, 425, 156/429, 431, 450, 458

[56] References Cited

U.S. PATENT DOCUMENTS

| | | | |
|---|---|---|---|
| 4,632,720 | 12/1986 | Meyer | 156/429 |
| 5,261,995 | 11/1993 | Golden | 156/428 |

*Primary Examiner*—Jenna Davis
*Attorney, Agent, or Firm*—Pravel, Hewitt, Kimball & Krieger

[57] ABSTRACT

An apparatus for wrapping a joint of pipe with a web of reinforced concrete includes an improved applicator that wraps the joint of pipe with a web of concrete that is reinforced with a steel mesh and which is also layered with a web of poly film. The improved applicator has a motor drive and a gear box that interfaces the motor drive with one of the belt pulleys that drives the applicator belt. The primary applicator belt can be disengaged from the pipe, thereby transferring both pulleys to idler pulleys after pipe wrapping is initiated. This allows the large motor drives that actually rotate the pipe to control the speed at which the web of concrete is applied to the pipe. The motor drive for the applicator belt is initially engaged for a few seconds to overcome initial friction associated with start up of the applicator. A timer can be used to regulate the number of seconds that the applicator motor operates until it is disengaged using the clutch.

9 Claims, 3 Drawing Sheets

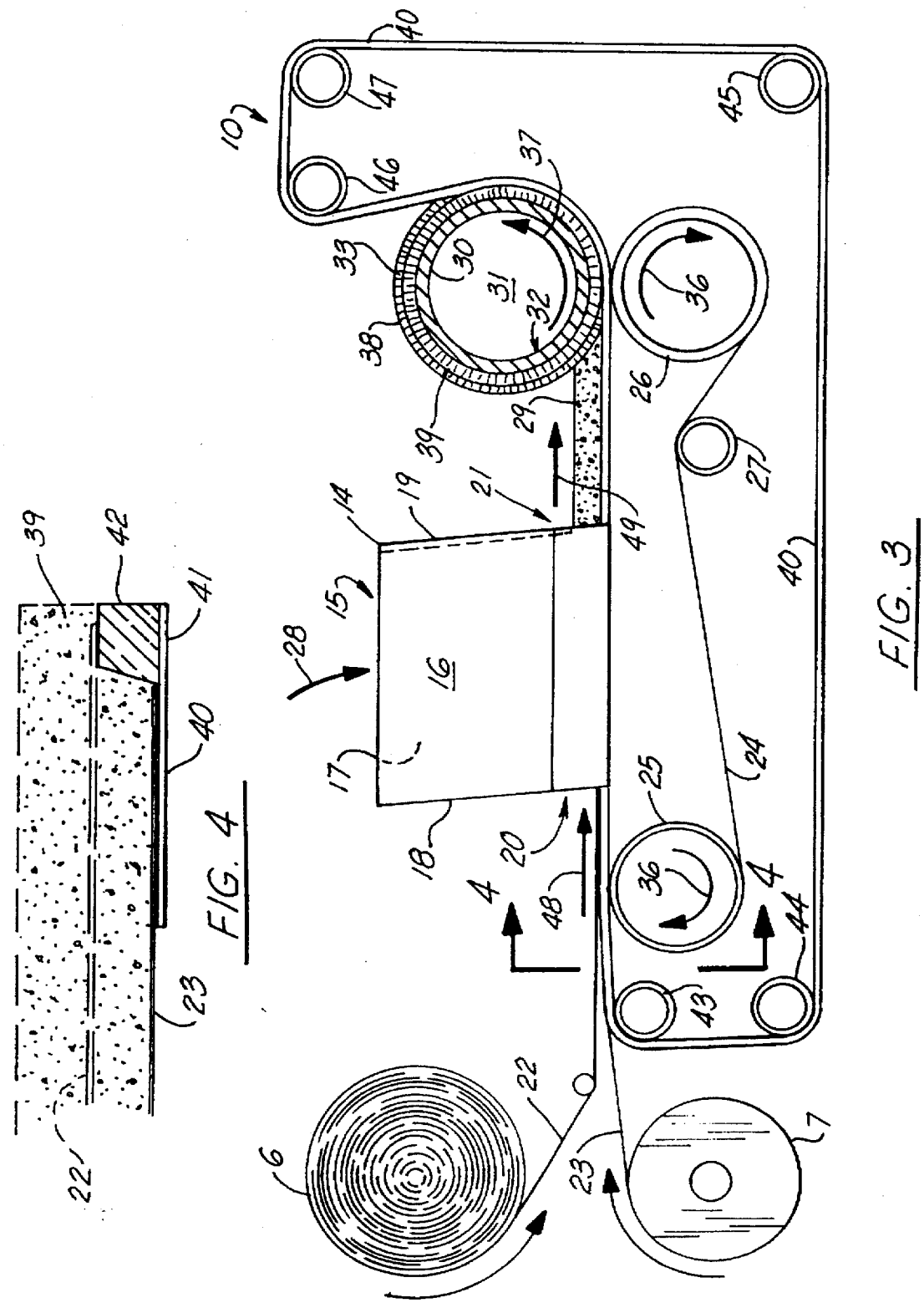

METHOD AND APPARATUS FOR WRAPPING A JOINT OF PIPE WITH A WEB OF CONCRETE MATERIAL

SPECIFICATION

BACKGROUND OF THE INVENTION

1. Field of the Invention

The present invention relates to the coating of pipe and like tubular material, namely the spiral wrapping of a joint of pipe with an elongated continuous web of concrete and more particularly to an improved apparatus for the wrapping of a joint of pipe with a web of concrete. More particularly, the present invention relates to an improved applicator apparatus that continuously spirally wraps the pipe with the web of concrete, the improved applicator including an endless belt, a pair of pulleys, at least one of the pulleys being driven by a motor drive and a gear shaft, and a clutch is positioned outboard of the motor drive/gear box assembly. Even more particularly, the present invention relates to an improved pipe wrapping device that includes an applicator with a belt and pulleys, that can be quickly switched from a driven pulley to an idler pulley at the start of a wrapping of each joint of pipe such as when a rotary pipe conveyor and a belt head assume the rotation of the joint to be wrapped.

2. General Background

In the pipe coating industry, it is well known to spirally wrap a joint of pipe with a reinforced concrete web. Sometimes the web is thick, making the pipe very heavy for underwater installation. Early example of patents that discuss the spiral wrapping of a concrete web about a metal joint of pipe include for example Australian Patent No. 5702/32 dated Aug. 4, 1932 and entitled "PIPE COATING METHOD, MACHINE AND PRODUCT"; U.S. Pat. No. 1,979,656 issued Nov. 6, 1934 entitled "APPARATUS FOR WRAPPING PIPE"; and U.S. Pat. No. 2,037,043 issued Apr. 14, 1936 entitled "PIPE WRAPPING MACHINE". This technology was first commercially developed in about the late 1940's or the early 1950's by Compression Coat of Houston, Tex. Many patents have issued that were assigned to Compression Coat. Examples of compression coat patents include U.S. Pat. Nos. 4,006,049; 4,058,428; and 4,333,783. Each of these patents disclose or contemplate a mixture for mixing aggregate and cement to produce a concrete mass to be formed into a web, a mill for mixing water into the concrete mass, and a pipe conveyor for supporting, advancing and rotating a joint of pipe. This patent also discloses an applicator for wrapping the joint of pipe with a web of concrete, the applicator including an endless belt and a pair of pulleys that support the belt.

Pipe wrapping with concrete is usually accomplished by utilizing an elongated pipe conveyor that supports, advances, and rotates the pipe. A mobile head supports the front end portion of the pipe joint that has already been wrapped in concrete as it leaves an applicator. The applicator for wrapping the joint of pipe with a web of concrete can include an endless belt and a pair of pulleys that support the belt. The concrete web is typically transported to the pipe on the endless belt with a plastic film band placed under the concrete, between the concrete and the belt. Reinforcing wire can be fed from a roll to the endless belt for addition tot he concrete web as reinforcement.

U.S. Pat. Nos. 1,979,656 (issued to N. Whitman in 1934); 2,037,043 (issued to Postlewaite in 1933); 3,740,291 (issued to J. B. Mallard in 1973); 4,006,049 (issued to Garner Feb. 1, 1977); 4,058,428 (issued Nov. 15, 1977 to Case et al.); 4,333,783 issued to Gardner Jun. 8, 1982); and 4,544,426 (issued to Stockman Oct. 1, 1985) all disclose pipe wrapping devices that spirally wrap the pipe with a web of concrete that is fed with an applicator belt to the pipe on a layer of plastic, reinforced with wire. In some of these patents, the plastic film layer and reinforcing wire are fed continuously from a roll (see FIG. 3 of U.S. Pat. No. 4,058,428 and FIG. 1 of U.S. Pat. No. 4,333,783). The Whitman patent 1,979,656 relates to the wrapping of steel pipe with a mortar shell. The method of the Whitman patent includes the step of placing a spiral layer of mortar around the steel pipe and binding the same in place with an outer layer of material which may be fabric or other suitable material such as wire mesh or suitably prepared paper. When the coating process is completed, the binding material becomes a permanent part of the covering and provides the means of holding the mortar in place around the pipe. It also acts as a means of protecting the coating during handling. The Whitman device provides a means of rotatably supporting a section of pipe to be wrapped. A table is movable longitudinally of the pipe. The table having means for applying a preliminary coating of grout to the pipe. The table also having means for supporting a continuous tape arranged to be spirally wound around the pipe over the preliminary coating. The table also allows a layer of mortar to be deposited on the tape before it is wounded around the pipe.

The Postlewaite patent 2,037,043 relates to a machine for wrapping cylindrical objects (such as pipe) with a relatively thick coating of plastic material (such as a bituminous or cementitious mastic) which hardens or sets to form a firm adherent protective layer. The '043 patent is also directed to a method of and a means for applying such plastic material on a continuous tape or band of flexible material which is smoothly and uniformly lapped at the joints between adjacent turns. The machine of the '043 patent includes a shoot disposed at an angle to the pipe and space therefrom, the shoot adapted to guide a flexible tape to be wrapped helically around the pipe by relative motion thereof. Plastic material is supplied onto the tape whereby a continuous coating of appreciable thickness is formed on the pipe beneath the tape.

Australian patent 5702/32 issued in 1931 to Warren Kraner disclosed a process that includes the steps of continuously forming a layer of plastic concrete from a mass and continuously covering the layer away from the mass and continuously wrapping the layer spirally upon a pipe. The layer was formed with a reinforcing strip like wire screening embedded within the strip. The edges of the convolutions applied to the form lapped and then compacted. A strip of surfacing material will simultaneously wound upon the exterior of concrete applied to the pipe form. The Kraner patent also disclosed a means for supporting and rotating a pipe to be coated and a hopper is adapted to receive a mass of concrete. The hopper is adapted to receive a mass of concrete. The hopper included a lower discharge opening for guiding a strip of material like wire screening beneath the opening whereby concrete fed through the opening was distributed upon both sides of the strip. The strip together with the layer of concrete covering both sides of the same was then wound spirally on the pipe.

It is known to drive one of the rollers that support the belt with a chain drive using a motor (for example electric or hydraulic). However, once the applicator and the adjacent joint of pipe are rotated a short distance, the motor drives for the pipe conveyor and for the mobile belt head desirably rotate the pipe and pull the web of concrete from the applicator. If the applicator has a motor drive that drives the powered pulley of the applicator, problems can occur in obtaining an even application of the web.

One of the problems that can occur in the application of the web of material to the pipe is that of rotating the applicator at to high of a speed. This produces a loosening of the plastic web film that supports the concrete. However, another equally troublesome problem is that of powering the applicator pulley at to slow of a speed so that the motor drives of the pipe conveyor and mobile belt head are "pulling" at the web of material thus placing the underlying plastic film intention, stretching it and possibly rupturing it.

SUMMARY OF THE INVENTION

The present invention provides an improved method and apparatus for wrapping a joint of pipe with a web of reinforced concrete. The apparatus includes a mixer for mixing aggregate and cement to produce a concrete mass to be formed into a web.

A mill for mixing water and the concrete mass is provided. The mill includes a means for shaping the concrete into a continuous web. A pipe conveyor support rotatably supports and advances the joint of pipe to be wrapped.

An applicator for wrapping the joint of pipe with the web of concrete is provided, the applicator including a first endless belt having a pair of pulleys that support the belt under the mill, so that the concrete mix is deposited on the endless belt. A mobile belt head is provided for supporting the portion of the pipe joint that has been wrapped in concrete.

First and second motor drives are provided for respectively rotating the pipe at the pipe conveyor and at the mobile belt head. A third motor drive is provided for turning the endless belt of the applicator.

A gear box interfaces each of the first and second drive motors and the pipe conveyor and mobile belt head respectively. Another gear box interfaces the third motor drive and the endless belt of the applicator.

A clutch is provided for disengaging the gear box from the driven pulley of the endless belt after the first and second motor drives has reached a desired speed of rotation for the pipe joint, so that the driven pulley becomes an idler pulley when the clutch is disengaged.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein:

FIG. 3 is a partial side view of the preferred embodiment of the apparatus of the present invention; and FIG. 4 is a fragmentary sectional view illustrating the secondary belt portion of the preferred embodiment of the apparatus of the present invention.

DETAILED DESCRIPTION OF THE PREFERRED EMBODIMENT

Figure 1:
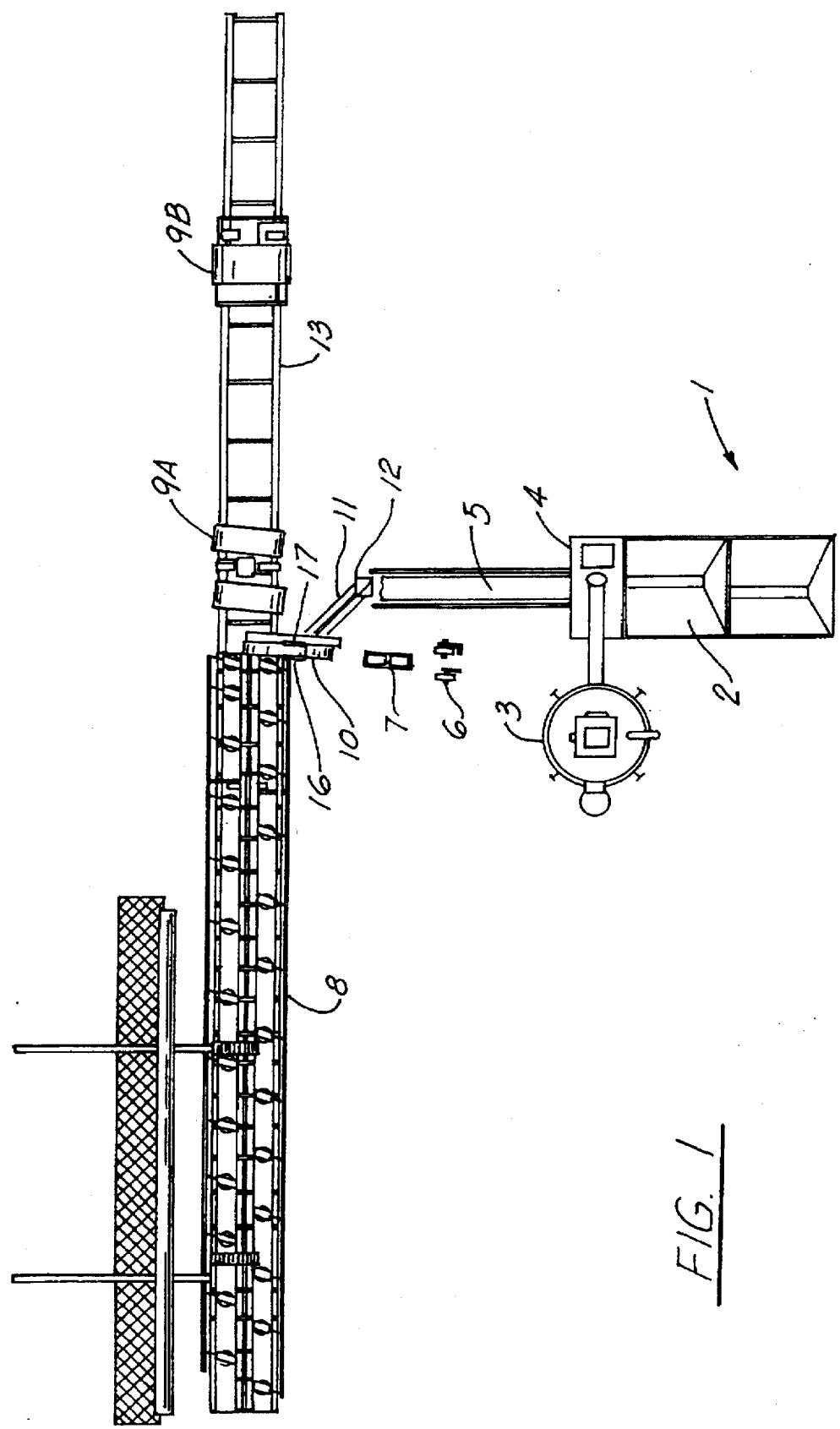
FIG. 1 is a plan view of a pipe coating system for wrapping pipe with concrete as used with the preferred embodiment of the apparatus of the present invention.
Figure 2:
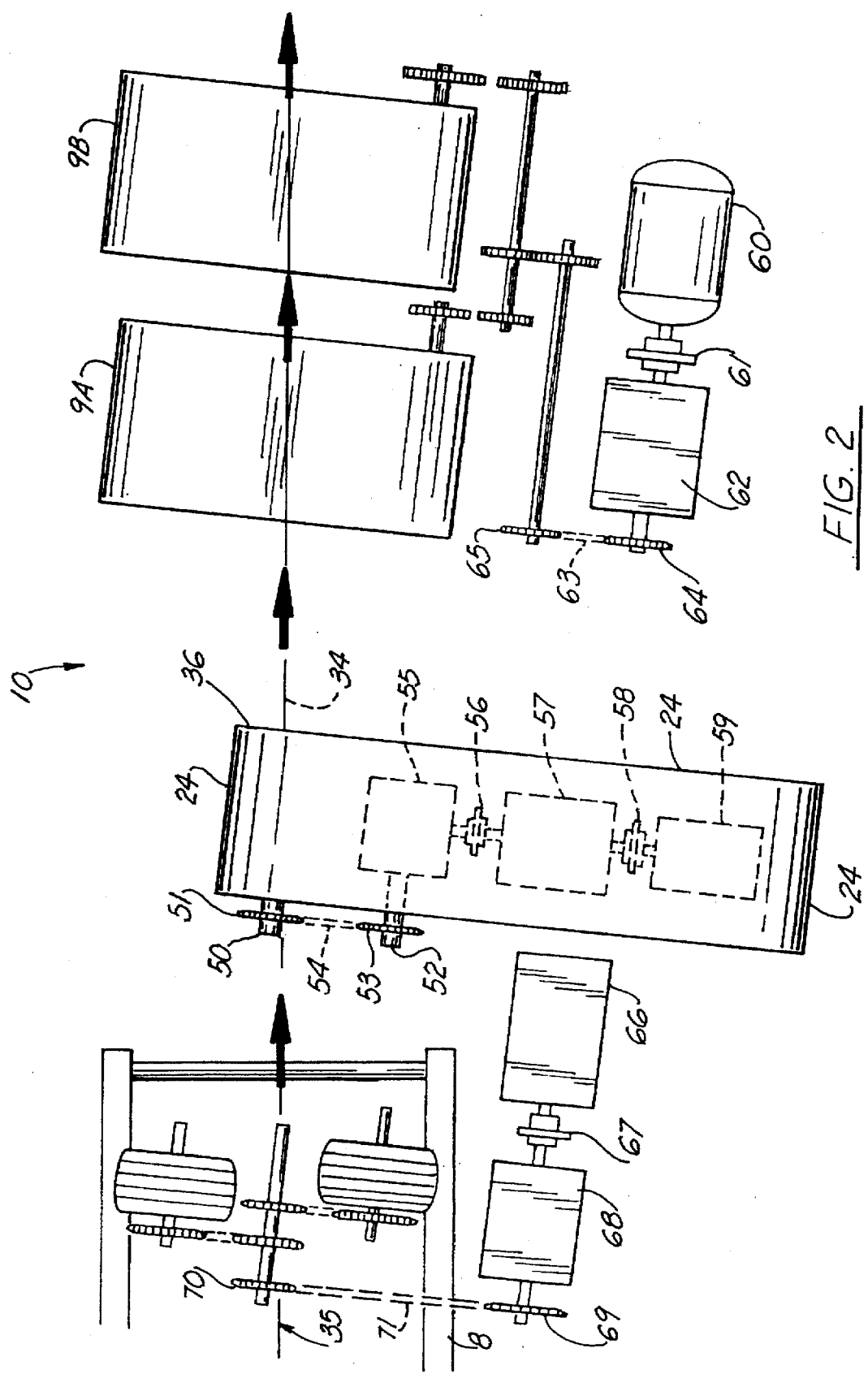
FIG. 2 is a partial plan view of the preferred embodiment of the apparatus of the present invention.

FIGS. 1 and 2–3 show generally the preferred embodiment of the apparatus of the present invention designated generally by the numeral 10 in FIGS. 1–3.

In FIG. 1, there can be seen an overall plan view of a wrap-on concrete plant designated generally as 1. Concrete plant 1 includes a hopper feed and metering unit 2 and cement silo 3, a cement feed and metering unit 4 and a feed conveyor 5. Additionally, a wire payoff unit 6 and a poly film payoff unit 7 are used for directing a web of reinforcing wire and a web of poly film to the applicator 10 of the present invention. An inbound spiral conveyor 8 transports an elongated joint of pipe (for example a 40 ft. joint) to the applicator 10. Belt head 9 supports the coated end portion of the joint of pipe after is passes applicator 10.

Applicator 10 is shown in more detail in FIGS. 2 and 3. The applicator 10 receives a flow of cement from material mixing unit 11 and water meter unit 12. Thus, when the cement mixture reaches applicator 10, it is a combination of cement, aggregate, and water.

An elongated track 13 can support a second belt head 9b that typically is a moving belt head.

It should be understood that the overall layout of a wrap on concrete plant is well known in the art. Thus, the use of a concrete plant having a hopper feed and metering unit, a cement silo, a cement feed and metering unit, and a feed conveyor are well known. Additionally, it is known in the art to use a wire payout unit and a poly film payoff unit to supply a web of reinforcing wire and poly film respectively to pipe to be wrapped. Additionally, the use of an inbound spiral conveyor to convey the pipe joint to be wrapped is known in the art. Further, it is known in the art to use an elongated track 13 to support the pipe after it has been wrapped using one or more belt heads 9a, 9b for example.

Applicator 10 more particularly includes an applicator hopper 14 having an open top 15 side walls 16, 17 and end walls 18, 19. The hopper 14 provides an open inlet 20 that allows belt 24 to travel through the hopper 16 so that a concrete mix can be deposited on endless belt 24 for applicator to pipe 30.

Applicator hopper 14 also provides an outlet gate 21 of a desired size and shape for defining the cross-sectional area of a concrete web 29 to be applied to the pipe joint 30.

An incoming wire mesh web 22 and an incoming poly film incoming web 23 are supplied via roll 6 and roll 7 to the endless applicator belt 24 as shown in FIG. 3. Endless applicator belt 24 is supported by a plurality of pulleys 25–27.

During use, arrow 28 indicates that addition of concrete to the open top 15 of hopper 14 as endless belt 24 advances in the direction of arrows 48, 49 concrete mix added to hopper 15 exits outlet gate 21 as shown in FIG. 3.

A second endless belt 40 is used to conform the web 29 of concrete to the outer surface 33 of pipe joint 30. In FIG. 3, the bore 31 of pipe joint 30 as shown as is the inside surface 32 of pipe joint 30 and its outside surface 33. Arrow 37 in FIG. 3 indicates the direction of rotation of the pipe joint 30. Arrows 36 indicate the direction of rotation of pulleys 25, 26. Pipe 30 desirably sits upon pulley 26. The pulley 26 can be a driven pulley as shown in FIG. 2, being driven by drive shaft 50.

In FIG. 2, pipe 30 has a central longitudinal axis 34 that is also the central longitudinal axis 35 of inbound spiral conveyor 8. In FIG. 3, the web of concrete 29 has been applied to the outer surface 33 of pipe joint 30, thus creating a concrete coating 38 that is spirally wrapped. The applicator belt 24 is off-set by an acute angle with respect to the axis 34, 35. This creates a spiraling application of the concrete web 29 to the outer surface 33 of pipe joint 30.

A stepped leading edge 39 is formed by forming belt 40 as the concrete web 29 is wrapped onto outer surface 33 of pipe joint 30. Forming belt 40 as shown in FIG. 4 includes a wider flat portion 41 that is preferably the same width as or slightly smaller than the width of belt 24. Forming belt 40 also includes thinner raised portion 42 that creates a step at one edge of concrete web 29 as shown in FIG. 4. Forming belt 40 is supported upon a plurality of rollers or pulleys 43–49 as shown in FIG. 3. Arrows 48, 49 indicate the direction of travel of the forming belt 40 during use.

In FIG. 2, drive shaft 52 is shown connected to sprocket 51 for driving pulley 36. Sprockets 51 and 52 are connected by chain 54. Drive shaft 52 is connected to clutch 55. Clutch 55 is coupled to gear box 57 with coupling 56. Gear Box 57 rotates, being driven by motor drive 59 that is coupled to gear box 57 at coupling 58. During use, the clutch 55 can be disengaged so that the pulley 36 becomes either a driven pulley or an idler pulley as desired. This is important because the wrapping of pipe is desirably performed by imparting a rotation to the pipe of joint with two drive motors 60 and 66 rather than by the drive motor 59. This allows the drive motor 59 to be much smaller, thus only acting as a start up for the pulley 36 when pipe wrapping is initiated. After that, the clutch 55 is disengaged so that the drive motor 60 and 66 actually rotate the joint of pipe. In FIG. 2, the drive motor 60 is connected via coupling 61 to gear box 62. The clutch can comprise a pair of clutch disk members that are movable between disengaged and engaged positions. The clutch disks are preferably spaced apart in the disengaged position and abut one another in the engaged position.

Gear box 62 drives sprocket 64 and sprocket 65, the sprockets 64, 65 being connected with chain 63. Additional shafts and sprockets can be used to drive belt heads 9a, 9b with motor 60. Inbound spiral conveyor 8 is driven by drive motor 66, coupling 67, gear box 68, and sprocket 69, 70 connected by chain 71. The aforementioned apparatus 10 allows the two larger drive motors 60, 66 to control rotation of the pipe. Because the pipe is very heavy, it must be supported during the wrapping operation by inbound spiral conveyor 8 and belt heads 9a, 9b. Thus, much heavier motor 60 and 66 are required to drive the pipe supporting inbound spiral conveyor 80 and the pipe supporting belt heads 9a, 9b. The applicator 10 however desirably only supports the weight of the concrete web and not the full weight of the pipe being coated. Therefore, the apparatus of the present invention allows a disengagement of motor drive 59 and its gear box 57 from pulley 36 once an initial momentum is built up in the pulley 36 and the pipe joint 30. This occurs when pipe wrapping first starts. Thereafter, the clutch 55 disengages so that the pipe joint being coated is supported and rotated by the inbound spiral conveyor 8, its drive motor and gear box 66–68 and the belt heads 9a–9b and their associated drive motor and gear box 60–62.

The following table lists the parts numbers and parts descriptions as used herein and in the drawings attached hereto.

PARTS LIST

| Part Number | Description |
| --- | --- |
| 1 | concrete plant |
| 2 | hopper, feed and metering unit |
| 3 | cement silo |
| 4 | cement feed and metering |
| 5 | feed conveyor |
| 6 | wire payoff unit |
| 7 | poly film payoff unit |
| 8 | inbound pipe conveyor |
| 9a | belthead |
| 9b | belthead |
| 10 | applicator |
| 11 | material mixing unit |
| 12 | water meter unit |
| 13 | track |
| 14 | applicator hopper |
| 15 | open top |
| 16 | side wall |
| 17 | side wall |
| 18 | end wall |
| 19 | end wall |
| 20 | inlet |
| 21 | outlet gate |
| 22 | wire mesh incoming web |
| 23 | poly film incoming web |
| 24 | endless applicator belt |
| 25 | pulley |
| 26 | pulley |
| 27 | pulley |
| 28 | arrow, concrete addition |
| 29 | web of concrete |
| 30 | pipe joint |
| 31 | pipe bore |
| 32 | inside surface |
| 33 | outer surface |
| 34 | pipe central longitudinal axis |
| 35 | roller central longitudinal axis |
| 36 | curved arrow |
| 37 | curved arrow |
| 38 | concrete coating |
| 39 | stepped leading edge |
| 40 | forming belt |
| 41 | wider flat portion |
| 42 | thinner raised portion |
| 43 | roller |
| 44 | roller |
| 45 | roller |
| 46 | roller |
| 47 | roller |
| 48 | arrow |
| 49 | arrow |
| 50 | drive shaft |
| 51 | sprocket |
| 52 | drive shaft |
| 53 | sprocket |
| 54 | chain |
| 55 | clutch |
| 56 | coupling |
| 57 | gear box |
| 58 | coupling |
| 59 | motor drive |
| 60 | motor drive |
| 61 | coupling |
| 62 | gear box |
| 63 | chain |
| 64 | sprocket |
| 65 | sprocket |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An apparatus for wrapping a joint of pipe with a web of reinforced concrete comprising:

a) a mixer for mixing aggregate and cement to produce a concrete mass to be formed into a web;

b) a mill for mixing water and the concrete mass, said mill having means for shaping the concrete into a continuous web;

c) a pipe conveyor for supporting, advancing, and rotating a joint of pipe;

d) an applicator for wrapping the joint of pipe with the web of concrete, said applicator including an endless belt and a pair of pulleys that support the endless belt;

e) a belt head for supporting the portion of the pipe joint that has been wrapped in concrete;

f) first and second motor drives for rotating the pipe at the pipe conveyor and at the belt head;

g) a third motor drive for turning the endless belt of the applicator;

h) a gear box that interfaces the endless belt of the applicator and one of the belt pulleys; and i) a clutch for disengaging the gear box from a driven belt pulley after the first and second motor drives have reached a desired speed of rotation for the pipe joint, so that the driven pulley becomes an idler pulley when the clutch is disengaged.

2. The apparatus of claim 1 wherein the clutch comprises a remotely operable clutch that can be engaged or disengaged from a remote location.

3. The apparatus of claim 2 wherein the clutch can be disengaged after rotating of a pipe joint to be coated has been commenced.

4. The apparatus of claim 2 further comprising a drive shaft that extends between the third motor drive and the gear box and the clutch means is positioned on the drive shaft.

5. The apparatus of claim 1 wherein the belt head is supported upon a frame along a longitudinal line that is coincident with the central longitudinal axis of the pipe joint to be wrapped.

6. The apparatus of claim 1 wherein the pipe conveyor comprises an elongated frame having a series of rollers thereon that continuously support the pipe joint to be wrapped along its length.

7. The apparatus of claim 1 wherein the clutch is electrically operated.

8. The apparatus of claim 1 wherein the clutch comprises a pair of clutch disk members that are movable between disengaged and engaged positions, and wherein the clutch disks are spaced apart in the disengaged position.

9. The apparatus of claim 1 wherein the first and second motor drives have coordinated rotational speeds during use so that the pipe conveyor and the belt head correspondingly rotate the pipe joint to be wrapped at the same revolutions per minute.

* * * * *